(12) United States Patent
Tian et al.

(10) Patent No.: US 12,021,455 B2
(45) Date of Patent: Jun. 25, 2024

(54) POWER SUPPLY DEVICE AND CHARGING CONTROL METHOD

(71) Applicants: GUANGDONG OPPO MOBILE TELECOMMUNICATIONS CORP., LTD., Guangdong (CN); Powerland Technology Inc., Jiangsu (CN)

(72) Inventors: Chen Tian, Guangdong (CN); Yao Zhou, Jiangsu (CN); Jialiang Zhang, Guangdong (CN)

(73) Assignees: GUANGDONG OPPO MOBILE TELECOMMUNICATIONS CORP., LTD., Guangdong (CN); POWERLAND TECHNOLOGY INC., Jiangsu (CN)

(*) Notice: Subject to any disclaimer, the term of this patent is extended or adjusted under 35 U.S.C. 154(b) by 210 days.

(21) Appl. No.: 17/842,046

(22) Filed: Jun. 16, 2022

(65) Prior Publication Data

US 2022/0311347 A1 Sep. 29, 2022

Related U.S. Application Data

(63) Continuation of application No. PCT/CN2019/130089, filed on Dec. 30, 2019.

(51) Int. Cl.
*H02M 3/335* (2006.01)
*H02M 1/00* (2006.01)
(Continued)

(52) U.S. Cl.
CPC ..... *H02M 3/33569* (2013.01); *H02M 1/0009* (2021.05); *H02M 3/01* (2021.05); *H02J 7/007* (2013.01); *H02J 2207/20* (2020.01)

(58) Field of Classification Search
CPC ............. H02M 3/33569; H02M 3/335; H02M 1/0009; H02M 3/01; H02J 7/007
See application file for complete search history.

(56) References Cited

U.S. PATENT DOCUMENTS 7,408,795 B2 * 8/2008 Vinciarelli ........ H02M 3/33571
363/125
9,948,190 B2 * 4/2018 Adragna ................. H02M 1/08
(Continued)

FOREIGN PATENT DOCUMENTS

CN 102810980 12/2012
CN 202949266 5/2013
(Continued)

OTHER PUBLICATIONS

EPO, Extended European Search Report for EP Application No. 19958177.8, Mar. 24, 2023.
(Continued)

*Primary Examiner* — Adolf D Berhane
(74) *Attorney, Agent, or Firm* — Hodgson Russ LLP (57) ABSTRACT

A power supply device and a charging control method are provided. The power supply device includes a first-stage conversion circuit and a second-stage conversion circuit; the first-stage conversion circuit is used for converting a received alternating current voltage into a pulsating direct current voltage, the voltage value of the pulsating direct current voltage being greater than the voltage value of the alternating current voltage; the second-stage conversion circuit is connected to the first-stage conversion circuit, and used for converting the pulsating direct current voltage to output a constant direct current voltage.

18 Claims, 9 Drawing Sheets

(51) Int. Cl.
   *H02M 3/00*    (2006.01)
   *H02J 7/00*    (2006.01)

(56) References Cited

U.S. PATENT DOCUMENTS

| | | | |
|---|---|---|---|
| 10,879,805 B2 * | 12/2020 | Notsch | H02M 3/33507 |
| 11,824,438 B2 * | 11/2023 | Mayell | H02M 1/38 |
| 2018/0205313 A1 | 7/2018 | Greetham et al. | |
| 2019/0326824 A1 | 10/2019 | Li et al. | |
| 2023/0283185 A1 * | 9/2023 | Tian | H02M 1/0009 |
| | | | 323/282 |

FOREIGN PATENT DOCUMENTS

| | | |
|---|---|---|
| CN | 105141135 | 12/2015 |
| CN | 205017081 | 2/2016 |
| CN | 207518331 | 6/2018 |
| WO | 2014205452 | 12/2014 |

OTHER PUBLICATIONS

WIPO, International Search Report and Written Opinion for PCT/CN2019/130089, Sep. 24, 2020.

\* cited by examiner

POWER SUPPLY DEVICE AND CHARGING CONTROL METHOD

CROSS REFERENCE OF RELATED APPLICATION

This application is a continuation of International Patent Application No. PCT/CN2019/130089, filed on Dec. 30, 2019, the entire disclosure of which is incorporated herein by reference.

TECHNICAL FIELD

The present disclosure relates to the field of charging technologies, and in particularly to a power supply device and a charging control method.

DESCRIPTION OF RELATED ART

Devices to be charged (e.g. smartphones, mobile terminals or smart devices) are increasingly popular with consumers, but the devices to be charged tend to consume a lot of power and need to be charged frequently. However, at present, power supply devices (for example, power adapters) are large and not portable, and user experience therefor is poor.

The above information provided in the Description of related art is intended merely to enhance the understanding of background of the present disclosure, and thus it may include information that does not constitute a prior art known to the skilled in the art.

SUMMARY

The present disclosure provides a power supply device and a charging control method, and a power supply device of a small volume can be achieved.

Other features and advantages of the present disclosure will become apparent through following detailed description, or will be learned in part through practice of the present disclosure.

According to one aspect of the present disclosure, a power supply device is provided, which includes: a first-stage conversion circuit, configured to convert a received alternating current (AC) voltage to a pulsating direct current (DC) voltage, where a voltage value of the pulsating DC voltage is greater than a voltage value of the AC voltage; and a second-stage conversion circuit, connected to the first-stage conversion circuit, and configured to convert the pulsating DC voltage to output a constant DC voltage.

According to an embodiment of the present disclosure, the first-stage conversion circuit includes at least one filter capacitor, a capacity of the filter capacitor is smaller than a preset value.

According to an embodiment of the present disclosure, the second-stage conversion circuit includes a first switching circuit and a transformer circuit; the power supply device further includes: a first detection circuit, connected to the transformer circuit, and configured to detect at least one of an output voltage and an output current of the transformer circuit; and a control circuit, connected to the first detection circuit and the first switching circuit, individually; where the control circuit is configured to output a control signal according to at least one of an output voltage value and an output current value detected by the first detection circuit, to control on-off states of the first switching circuit, to adjust the output voltage of the transformer circuit and thereby adjust a voltage value of the constant DC voltage.

According to an embodiment of the present disclosure, the control signal includes a pulse width modulated (PWM) signal and a pulse frequency modulated (PFM) signal; and the control circuit is configured to output one of the PWM signal and the PFM signal according to the at least one of the output voltage value and the output current value detected by the first detection circuit, to adjust the output voltage of the transformer circuit.

According to an embodiment of the present disclosure, the control circuit is configured to output one of the PWM signal and the PFM signal according to an output gain, to adjust the output voltage of the transformer circuit, where the output gain is a ratio of the output voltage of the transformer circuit to an inputted voltage of the transformer circuit; or the output gain is a ratio of an output voltage of the second-stage conversion circuit to an output voltage of the first-stage conversion circuit.

According to an embodiment of the present disclosure, the control circuit is configured to output the PWM signal during a first charging phase to adjust the output voltage of the transformer circuit, and configured to output the PFM signal during a second charging phase to adjust the output voltage of the transformer circuit; where an output voltage of the power supply device during the first charging phase is lower than an output voltage of the power supply device during the second charging phase.

According to an embodiment of the present disclosure, the control circuit is configured to: output the PWM signal to adjust the output voltage of the transformer circuit, in response to the at least one of the output voltage of the transformer circuit being smaller than a predetermined first voltage threshold, and the output current of the transformer circuit being smaller than a predetermined first current threshold; output the PFM signal to adjust the output voltage of the transformer circuit, in response to the at least one of the output voltage of the transformer circuit being greater than or equal to the first voltage threshold, and the output current of the transformer circuit being greater than or equal to the first current threshold.

According to an embodiment of the present disclosure, the second-stage conversion circuit includes a first switching circuit and a transformer circuit; the power supply device further includes: a first detection circuit, configured to detect at least one of an output voltage and an output current of the power supply device; and a control circuit, connected to the first detection circuit and the first switching circuit, individually; where the control circuit is configured to output a control signal according to at least one of an output voltage value and an output current value detected by the first detection circuit, to control on-off states of the first switching circuit, and adjust the output voltage of the transformer circuit and thereby adjust a voltage value of the constant DC voltage.

According to an embodiment of the present disclosure, the control circuit is further configured to receive feedback information from a device to be charged connected to the power supply device, and control the control signal for the first switching circuit according to the feedback information to adjust at least one of an output voltage and an output current of the power supply device.

According to an embodiment of the present disclosure, the feedback information includes at least one of a desired charging voltage of and a desired charging current of the device to be charged, and or the feedback information includes an adjustment command generated by the device to be charged based on the at least one of the desired charging voltage and the desired charging current.

According to an embodiment of the present disclosure, the first-stage conversion circuit includes a second switching circuit; where the power supply device further includes: a second detection circuit, connected to the first-stage conversion circuit and the control circuit, individually, where the second detection circuit is configured to detect at least one of an output voltage and an output current of the first-stage conversion circuit; where the control circuit is further configured to output a second control signal according to the at least one of the output voltage and the output current of the first-stage conversion circuit, to control on-off states of the second switching circuit and thereby adjust one of the output voltage and the output current of the first-stage conversion circuit.

According to an embodiment of the present disclosure, the second control signal includes a PWM signal and a PFM signal; the control circuit is configured to output one of the PWM signal or the PFM signal of the second control signal according to the at least one of the output voltage and the output current of the first-stage conversion circuit, to adjust the at least one of the output voltage and the output current of the first-stage conversion circuit and thereby make the output voltage of the first-stage conversion circuit be equal to a preset reference voltage.

According to an embodiment of the present disclosure, the capacitor includes at least one selected from the group consisting of: a film capacitor, a multilayer ceramic capacitor, a surface-mounted capacitor and an electrolytic capacitor.

According to an embodiment of the present disclosure, the first-stage conversion circuit includes a totem-pole boost circuit.

According to an embodiment of the present disclosure, the first-stage conversion circuit includes: a rectifier circuit and a boost circuit.

According to an embodiment of the present disclosure, the second-stage conversion circuit includes an inductor—inductor—capacitor (LLC) resonant converter.

According to another aspect of the present disclosure, a charging control method is provided, which is implemented by a power supply device and includes: converting, by a first-stage conversion circuit, a received AC voltage to a pulsating DC voltage, where a voltage value of the pulsating DC voltage is greater than a voltage value of the AC voltage; and converting, by a second-stage conversion circuit, the pulsating DC voltage to output a constant DC voltage.

According to an embodiment of the present disclosure, the first-stage conversion circuit includes at least one filter capacitor, a capacity of the filter capacitor is smaller than a preset value.

According to an embodiment of the present disclosure, the method further includes: detecting at least one of an output voltage and an output current of a transformer circuit of the second-stage conversion circuit; outputting a control signal according to the at least one of the output voltage and the output current value of the transformer circuit, to control on-off states of a first switching circuit of the second-stage conversion circuit, to adjust the output voltage of the transformer circuit and thereby adjust a voltage value of the constant DC voltage.

According to an embodiment of the present disclosure, the control signal includes a PWM signal and a PFM signal; the outputting a control signal according to the at least one of the output voltage and the output current of the transformer circuit, to control on-off states of a first switching circuit of the second-stage conversion circuit, and adjust the output voltage of the transformer circuit and thereby adjust a voltage value of the constant DC voltage specifically includes: outputting the PWM signal or the PFM signal according to at least one of an output voltage value and an output current value of the transformer circuit, to adjust the output voltage of the transformer circuit.

According to an embodiment of the present disclosure, the outputting the PWM signal or the PFM signal according to at least one of an output voltage value and an output current value of the transformer circuit, to adjust the output voltage of the transformer circuit specifically includes: outputting the PWM signal or the PFM signal according to an output gain, to adjust the output voltage of the transformer circuit; where the output gain is a ratio of the output voltage of the transformer circuit to an inputted voltage of the transformer circuit; or the output gain is a ratio of an output voltage of the second-stage conversion circuit to an output voltage of the first-stage conversion circuit.

According to an embodiment of the present disclosure, the outputting the PWM signal or the PFM signal according to at least one of an output voltage value and an output current value of the transformer circuit, to adjust the output voltage of the transformer circuit specifically includes: outputting the PWM signal during a first charging phase to adjust the output voltage of the transformer circuit, and outputting the PFM signal during a second charging phase to adjust the output voltage of the transformer circuit; where an output voltage of the power supply device during the first charging phase is smaller than an output voltage of the power supply device during the second charging phase.

According to an embodiment of the present disclosure, the outputting the PWM signal or the PFM signal according to at least of an output voltage value and an output current value of the transformer circuit, to adjust the output voltage of the transformer circuit specifically includes: outputting the PWM signal to adjust the output voltage of the transformer circuit, in response to the at least one of the output voltage of the transformer circuit being smaller than a predetermined first voltage threshold, and the output current of the transformer circuit being smaller than a predetermined first current threshold; outputting the PFM signal to adjust the output voltage of the transformer circuit, in response to the at least one of the output voltage of the transformer circuit being greater than or equal to the first voltage threshold, and the output current of the transformer circuit being greater than or equal to the first current threshold.

According to an embodiment of the present disclosure, the method further includes: detecting at least one of an output voltage and an output current of the power supply device; and outputting a control signal according to the at least one of the output voltage and the output current of the power supply device, to control on-off states of a first switching circuit of the second-stage conversion circuit, to adjust an output voltage of a transformer circuit of the second-stage conversion circuit and thereby adjust a voltage value of the constant DC voltage.

According to an embodiment of the present disclosure, the method further include: receiving feedback information from a device to be charged connected to the power supply device; controlling the control signal for the first switching circuit according to the feedback information to adjust at least one of an output voltage and an output current of the power supply device.

According to an embodiment of the present disclosure, the feedback information includes at least one a desired charging voltage of the device to be charged, and a desired charging current of the device to be charged, or the feedback information includes an adjustment command generated by the device to be charged according to the at least one of the desired charging voltage and the desired charging current.

According to an embodiment of the present disclosure, the method further includes: detecting at least one of an output voltage and an output current of the first-stage conversion circuit; and outputting a second control signal according to the at least one of the output voltage and the output current of the first-stage conversion circuit, to control on-off states of the second switching circuit and thereby adjust the at least one of the output voltage and the output current of the first-stage conversion circuit.

According to an embodiment of the present disclosure, the second control signal includes a PWM signal and a PFM signal; the outputting a second control signal according to the at least one of the output voltage and the output current of the first-stage conversion circuit, to control on-off states of the second switching circuit and thereby adjust the at least one of the output voltage and the output current of the first-stage conversion circuit specifically includes: outputting one of the PWM signal and the PFM signal according to the at least one of the output voltage and the output current of the first-stage conversion circuit, to adjust the at least one of the output voltage and the output current of the first-stage conversion circuit and thereby make the output voltage of the first-stage conversion circuit be equal to a preset reference voltage.

The power supply device provided in the embodiment of the present disclosure employs a two-stage architecture consisting of the first-stage conversion circuit and the second-stage conversion circuit. Since the first-stage conversion circuit boosts an inputted AC voltage, a variable bus voltage exists between the two-stage architecture, and energy storage function is achieved through variation of the bus voltage, thereby a large volume capacitor is not required to act as an energy storage element. Removing of the large volume capacitor can reduce a volume of the power supply device.

It should be understood that the above general description and detailed description hereinafter are merely exemplary and are not intended to limit the present disclosure.

BRIEF DESCRIPTION OF DRAWINGS

The above objects and other objects, features and advantages of the present disclosure will become more apparent through a detailed description of exemplary embodiments of the present disclosure with reference to accompanying drawings.

DETAILED DESCRIPTION OF EMBODIMENTS

Exemplary embodiments will now be described more fully with reference to accompanying drawings. However, the exemplary embodiments can be implemented in a variety of forms and should not be construed as being limited to examples set forth herein. In contrast, providing these embodiments enables the present disclosure to be more comprehensive and complete and communicates conception of the exemplary embodiments in a comprehensive manner to the skilled in the art. The described features, structures, or characteristics may be combined in any suitable manner in one or more embodiments.

Furthermore, the accompanying drawings are merely schematic illustrations of the present disclosure and are not necessarily drawn to scale. The same reference numbers in the accompanying drawings indicate the same or similar parts, and thus repetitive descriptions thereof will be omitted. Some of blocks shown in the accompanying drawings are functional entities and do not necessarily have to correspond to physically or logically separate entities. These functional entities may be implemented in software form, or may be implemented in one or more hardware modules or integrated circuits, or may be implemented in different networks and/or processor devices and/or microcontroller devices.

In the present disclosure, unless otherwise expressly specified and limited, terms "connected" and "connection" are to be understood broadly, for example, as fixed connection, as removable connection, or as integrally connection; as mechanical connection, as electrical connection, or as communication connection; as direct connection, as indirect connection through an intermediate medium, as connection within two elements, or as interaction between two elements. For the skilled in the art, specific meanings of the above terms in the present disclosure can be understood according to specific conditions.

In addition, terms "first" and "second" are merely used for descriptive purposes and are not intended to be construed as indicating or implying relative importance or implicitly specifying the number of technical features indicated. Thus, a feature qualified with "first" and "second" may explicitly or implicitly include one or more such features. In description of the present disclosure, "a plurality of or multiple" means at least two, e.g., two, three, etc., unless otherwise expressly and specifically limited. A term "and/or" is used to describe an association of related objects, and indicates that three relationships may exist, for example, "A and/or B" indicates the presence of A alone, B alone, and both A and B.

As described above, current power supply devices are large since larger energy storage elements are required to store energy.

Figure 1:
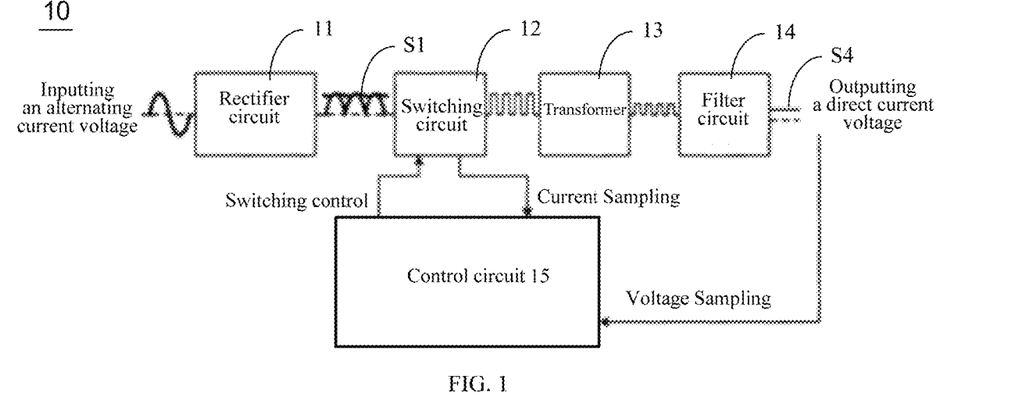
FIG. 1 illustrates a schematic structural view of a power supply device in a related art according to an example.

FIG. 1 illustrate a schematic structural view of a power supply device in a related art according to an example. As shown in FIG. 1, the power supply device 10 includes: a rectifier circuit 11, a switching circuit 12, a transformer 13, a filter circuit 14, and a control circuit 15.

Specifically, the rectifier circuit 11 is used to rectify a received alternating current (AC) voltage (e.g., an commercial power provided by a grid) to output a pulsating direct current (DC) voltage indicated by a signal S1 as shown in FIG. 1.

The switching circuit 12, the transformer 13 and the filter circuit further convert the pulsating DC voltage output from the rectifier circuit 11, to output a constant DC voltage (as indicated by a signal S4).

The control circuit 15 samples a voltage output from the power supply device 10 and a current output from the switching circuit 12, individually; and controls the switching circuit 12 according to a voltage-sampling signal and a current-sampling signal, to control an output voltage and/or an output current of the power supply device 10.

As shown in FIG. 1, the rectifier circuit 11 includes a large volume capacitor for energy storage. Since the large volume capacitor is usually a liquid electrolytic capacitor of a large volume, the power supply device 10 is large in volume and not portable, and user experience therefor is poor.

Power supply devices in exemplary embodiments of the present disclosure will be described in more detail hereinafter in combination with the accompanying drawings and the embodiments.

Figure 2:
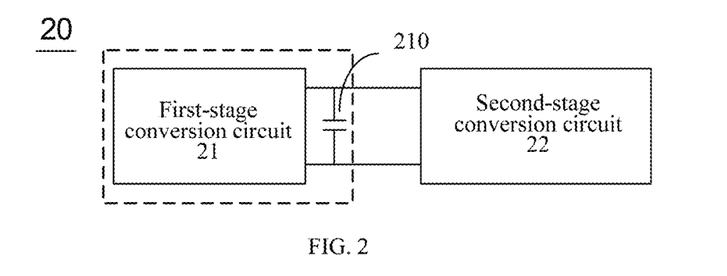
FIG. 2 illustrates a schematic structural view of a power supply device according to an exemplary embodiment.

FIG. 2 illustrates a schematic structural view of a power supply device according to an exemplary embodiment.

Referring to FIG. 2, the power supply device 20 includes: a first-stage conversion circuit 21 and a second-stage conversion circuit 22.

Specifically, the first-stage conversion circuit 21 may be, for example, a boost circuit, and is used to convert a received alternating current voltage (e.g., commercial power received from a grid) to a pulsating DC voltage of a voltage value greater than that of the alternating current voltage.

A voltage value of the pulsating DC voltage output from the first-stage conversion circuit 21 for example is in a range from 390 volts (V) to 450 V.

The second-stage conversion circuit 22 is connected to the first-stage conversion circuit 21, and is used to convert the pulsating DC voltage output from the first-stage conversion circuit 21 to output a constant DC voltage as an output voltage of the power supply device 20.

It should be understood by the skilled in the art that the constant DC voltage output from the second-stage conversion circuit 22 is a constant DC voltage without a pulsating waveform, but a voltage value of the constant DC voltage is not unique, and different voltage values may be output in different charging scenarios or charging phases.

The power supply device 20 provided in the embodiment of the present disclosure employs a two-stage architecture consisting of the first-stage conversion circuit and the second-stage conversion circuit. The first-stage conversion circuit boosts an inputted AC voltage, such that a variable bus voltage exists between the two-stage architecture, and energy storage function is achieved through variation of the bus voltage, thereby a large volume capacitor is not required to act as an energy storage element. Removing of the large volume capacitor can reduce a volume of the power supply device 20.

In addition, as described above, the large volume capacitor typically is a liquid electrolytic capacitor, and the liquid electrolytic capacitor has a short service life and is prone to bursting. Removing of the liquid electrolytic capacitor may also improve a service life and safety of the power supply device 20.

In some embodiments, the first-stage conversion circuit 21 may further include at least one filter capacitor 210 with less filtering capability (e.g., a capacity thereof is less than a preset value or a volume thereof is less than a preset volume threshold). The filter capacitor 210 is used for filtering burr of the pulsating voltage output from the first-stage conversion circuit 21, to improve quality of a output current of the power supply device 20. The filter capacitor 210 may be, for example, a film capacitor, or a multilayer ceramic capacitor (MLCC), or a surface-mounted capacitor; or may also be an electrolytic capacitor with a capacity smaller than the preset value. A volume and/or a capacity of the filter capacitor 210 is/are small and therefore has/have no large impact on the volume of the power supply device.

Figure 3A:
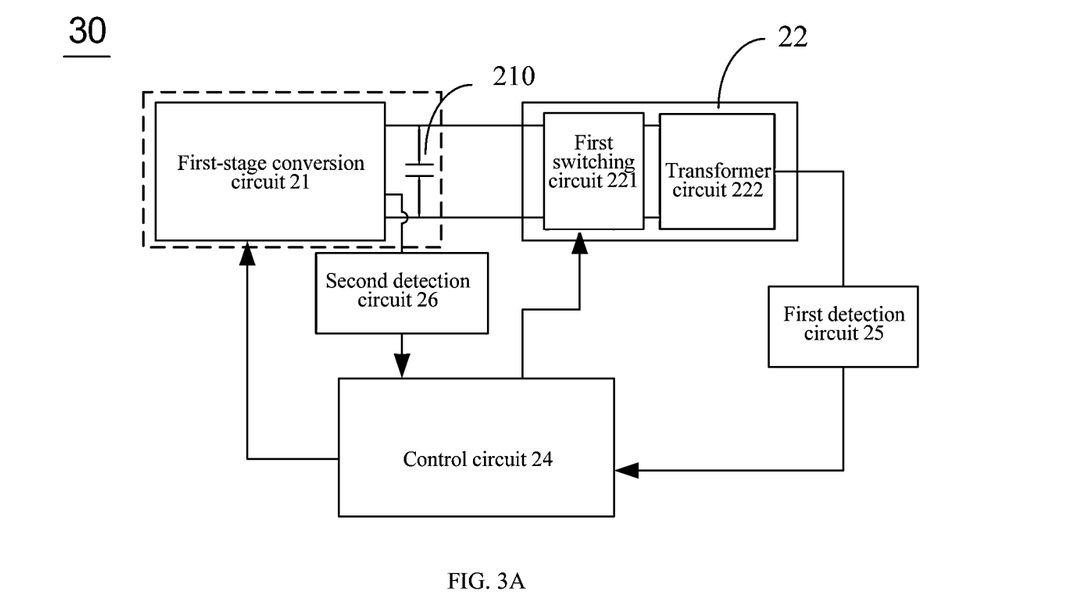
FIG. 3A illustrates a schematic structural view of another power supply device according to an exemplary embodiment.

FIG. 3A illustrates a schematic structural view of another power supply device according to an exemplary embodiment.

Different from the power supply device 20 shown in FIG. 2, for the power supply device 30 shown in FIG. 3A, the second-stage conversion circuit 22 may further include: a first switching circuit 221 and a transformer circuit 222.

The power supply device 30 may further include a control circuit 24 and a first detection circuit 25. The first detection circuit 25 is connected to the transformer circuit 222, and is used to detect an output voltage and/or an output current of the transformer circuit 222. The control circuit 24 is connected to the first detection circuit 25 and the first switching circuit 221, individually; and is used to output a control signal according to the output voltage and/or the output current of the transformer circuit 222 detected by the first detection circuit 25, to control on-off states of the first switching circuit 221, and adjust the output voltage of the transformer circuit 222 and thereby adjust a voltage value of a constant DC voltage output by the power supply device 30.

The detected output voltage and/or the output current may be a sampling signal(s) of the output voltage and/or the output current of the transformer circuit 222.

The transformer circuit 222 may couple electrical energy from a primary side to a secondary side in an electromagnetic coupling manner. Electrical energy coupled to the secondary side may be drawn from electrical energy output from the first-stage conversion circuit 21. The manner in which the electrical energy is drawn may be controlled by the control circuit 24 according to the detected output voltage and/or the output current of the transformer circuit 222.

In some embodiments, the first detection circuit 25 may further directly detect an output voltage and/or an output current of the power supply device 30. The control circuit 24 may output a control signal according to the output voltage and/or the output current of the power supply device 30, to control the on-off states of the first switching circuit 221, and adjust the output voltage of the transformer circuit 222 and thereby adjust the voltage value of the constant DC voltage output by the power supply device 30. The output voltage and/or the output current may be sampling signal(s) of the output voltage and/or the output current of the power supply device 30.

Figure 4:
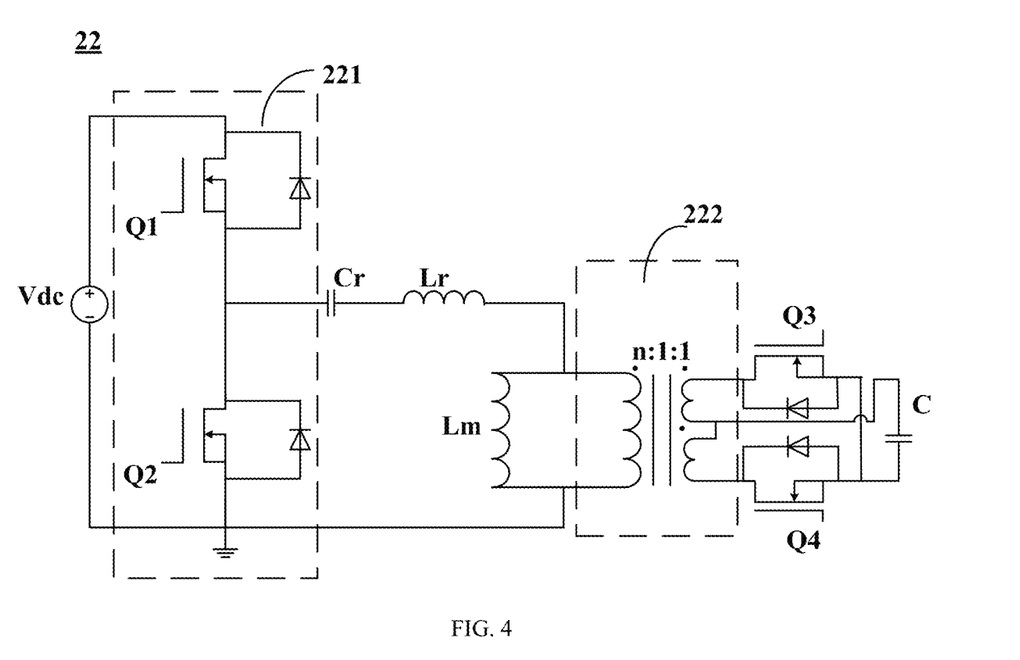
FIG. 4 illustrates a circuit structure view of an LLC resonant converter according to an exemplary embodiment.

In some embodiments, the second-stage conversion circuit 22 may be implemented, for example, as an LLC resonant converter as shown in FIG. 4. Specifically, the first switching circuit 221 includes Metal-Oxide-Semiconductor Field-Effect (MOS) transistors Q1 and Q2 before the transformer circuit 222. The first switching circuit 221 performs chopper modulation on the pulsating DC voltage output from the first-stage conversion circuit 21, to allow the modulated voltage to be transformed through the transformer circuit 222. In addition, MOS transistors Q3 and Q4 in the LLC resonant converter as shown in FIG. 4 are also controlled by the control signal sent by the control circuit 24.

Figure 5A:
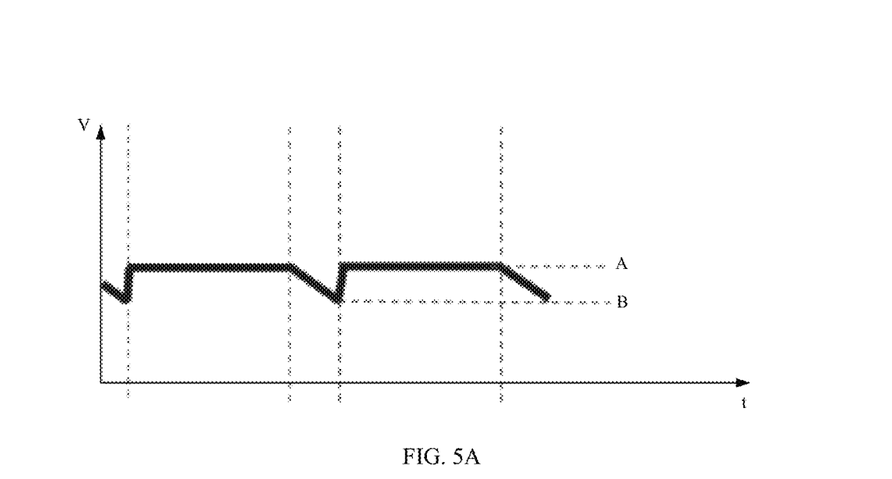
FIG. 5A illustrates a schematic view of a pulsating DC voltage according to an example.
Figure 5B:
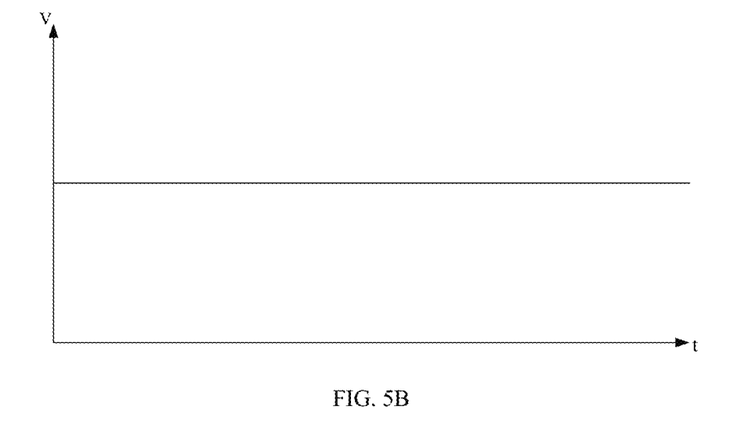
FIG. 5B illustrates a schematic view of a constant DC voltage according to an example.

FIG. 5A illustrates a schematic view of a pulsating DC voltage according to an example. In the embodiment, a large volume capacitor is not required to be used, and a voltage range of the pulsating DC voltage output from the first-stage conversion circuit is wide. As shown in FIG. 5A, the voltage range of the pulsating DC voltage (shown as dashed line A and dashed line B in FIG. 5A) is, for example, between 390 V and 450 V. The constant DC voltage is shown in FIG. 5B. As described above, the constant DC voltage output from the second-stage conversion circuit 22 is a constant DC voltage without a pulsating waveform, but the value of the constant DC voltage is not unique, and different voltage values may be output in different charging scenarios or charging phases.

It should be noted that the LLC resonant converter shown in FIG. 4 is merely exemplarily and is not intended to limit the present disclosure. A structure of the LLC resonant converter is well known to the skilled in the art and will not be described herein.

The control circuit 24 may be implemented, for example, as a micro control circuit (MCU). In order to enable the power supply device 30 to output a constant DC voltage, the control signal output from the control circuit 24 to the first switching circuit 221 may be a Pulse Frequency Modulation (PFM) signal or a Pulse Width Modulation (PWM) signal, for controlling the on-off states of the first switching circuit 221.

Specifically, in response to the PFM signal is output, a duty cycle of the PFM signal is kept constant, and the PFM signal is controlled by adjusting an interval (i.e., frequency) of the PFM signal. In response to the PWM signal is output, a frequency of the PWM signal is kept constant, and the PWM signal is controlled by adjusting a duty cycle (i.e., a signal width) of the PWM signal.

The control circuit 24 determines whether to output the PWM signal or to output the PFM signal according to the output voltage and/or the output current of the transformer circuit 222, or according to the output voltage and/or the output current of the power supply device 30.

In general, the frequencies of Q1 and Q2 in the first switching circuit 221 need to be set high in response to the output voltage and/or the output current of the power supply device 30 is low, such that an output gain of the power supply device 30 can be ensured. The output gain is a ratio of the output voltage of the power supply device 30 to an inputted voltage of the second-stage conversion circuit 22 (i.e., an output voltage of the first-stage conversion circuit). However, in a practical application, it is difficult to ensure that the frequencies of Q1 and Q2 in the first switching circuit 221 can be pushed to a high frequency due to various factors (such as device performance, circuit loss, electromagnetic interference, Printed Circuit Board (PCB) layout, etc.), and it is required to limit maximum frequencies of the MOS transistors Q1 and Q2 while considering efficiency and heat generation. However, in order to achieve a desired output gain, an duty cycle of an inputted signal should be changed, so in this case, it is required to make the power supply device 30 operate in a PWM mode (i.e., the PWM signal is output) to ensure the output gain of the power supply device 30.

To ensure conversion efficiency (i.e. the output gain) of the power supply device 30, in some embodiments, in response to the output voltage of the transformer circuit 222 is smaller than a preset first voltage threshold, and/or, in response to the output current of the transformer circuit 222 is smaller than a preset first current threshold, the control circuit 24 outputs the PWM signal, i.e. operates in the PWM mode.

In response to the output voltage of the transformer circuit 222 is greater than or equal to the first voltage threshold, and/or, in response to the output current of the transformer circuit 222 is greater than or equal to the first current threshold, the control circuit 24 outputs the PFM signal, i.e., operates in a PFM mode.

In some embodiments, as described above, the control circuit 24 may also determine which control mode to use according to the output voltage and/or the output current of the power supply device 30. In response to the output voltage of the power supply device 30 is smaller than the preset first voltage threshold, and/or, in response to the output current of the power supply device 30 is smaller than the preset first current threshold, the control circuit 24 outputs a PWM signal, i.e., operates in the PWM mode.

In response to the output voltage of the power supply device 30 is greater than or equal to the first voltage threshold, and/or, in response to the output current of the power supply device 30 is greater than or equal to the first current threshold, the control circuit 24 outputs a PFM signal, i.e. operating in the PFM mode.

The above first voltage threshold and first current threshold can be set according to a battery charging condition of a device to be charged connected to the power supply device 30. Taking a battery in the device to be charged being a two-cell series lithium battery for example, a desired charging voltage of the device to be charged is 10 V, the PWM mode described above may be used, in response to an output voltage of the power supply device is smaller than 10 V (e.g., 8 V or 9 V) at the beginning of charging. In response to the output voltage is 10 V, the PWM mode can be switched to the PFM mode, to control an inputted signal to adjust the output voltage and/or the output current of the power supply device 30.

In some embodiments, the control circuit 24 is used to output the PWM signal during a first charging phase, to adjust the output voltage of the transformer circuit 222, and is used to output the PFM signal during a second charging phase, to adjust the output voltage of the transformer circuit 222. Specifically, the output voltage of the power supply device 30 during the first charging phase is smaller than the output voltage of the power supply device 30 during the second charging phase. The first charging phase is, for example, a charging start stage, such as a trickle charging phase and/or a constant voltage charging phase. The second charging phase may be, for example, a subsequent constant current charging phase.

In some embodiments, the control circuit 24 is used to output the PWM signal or PFM signal according to the output gain, to adjust the output voltage of the transformer circuit 222. Specifically, the output gain may, for example, be a ratio of the output voltage of the transformer circuit 222 to the inputted voltage of the transformer circuit 222, or, the output gain may be a ratio of the output voltage of the second-stage conversion circuit 22 to the output voltage of the first-stage conversion circuit 21. In addition, the output gain may, for example, also be a ratio of the output voltage of the power supply device 30 to the inputted voltage of the transformer circuit 222.

In some embodiments, the control circuit 24 may further be used to receive feedback information from a device to be charged connected to the power supply device 30; and control the control signal inputted to the first switching circuit 221 according to the feedback information, to adjust the output voltage and/or the output current of the power supply device 30.

For example, in response to the PWM mode is determined to be used (i.e., the PWM signal is output), a duty cycle of the control signal inputted to the first switching circuit 221 is adjusted according to the feedback information, to adjust the output voltage and/or the output current of the power supply device 30. In response to the PFM mode is determined to be used (i.e., the PFM signal is output), a frequency of the control signal inputted to the first switching circuit 221 is adjusted according to the feedback information, to adjust the output voltage and/or the output current of the power supply device 30.

The feedback information may include, for example, a desired charging voltage and/or a desired charging current of the device to be charged. Alternatively, the feedback information may also include: an adjustment command generated by the device to be charged according to on the desired charging voltage and/or the desired charging current.

In embodiments of the present disclosure, the first-stage conversion circuit is used in a first-stage architecture to rectify and boost the AC voltage, thus a large volume capacitor (e.g., a liquid electrolytic capacitor) is not required. However, since the output voltage of the first-stage conversion circuit is not constant, the PFM mode or the PWM mode can also be used to control an inputted signal of the switching circuit in the first-stage conversion circuit to ensure stability of the output gain and output voltage of the first-stage conversion circuit.

The first-stage conversion circuit 21 may include a second switching circuit. In addition, the power supply device 30 may, for example, also include a second detection circuit 26 as shown in FIG. 3A, for detecting the output voltage and/or the output current of the first-stage conversion circuit 21. The control circuit 24 outputs a control signal according to the output voltage and/or the output current detected by the second detection circuit 26, to control on-off states of the second switching circuit adjust the output voltage and/or the output current of the first-stage conversion circuit 21.

Figure 6A:
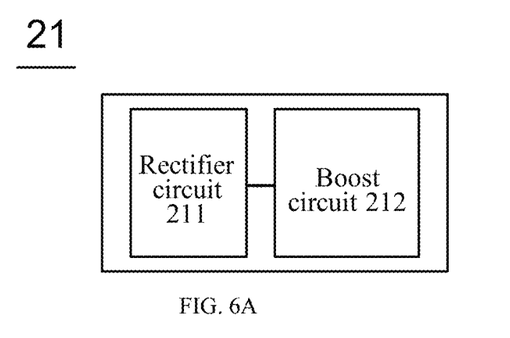
FIG. 6A illustrates a schematic structural view of a boost circuit according to an exemplary embodiment.
Figure 6B:
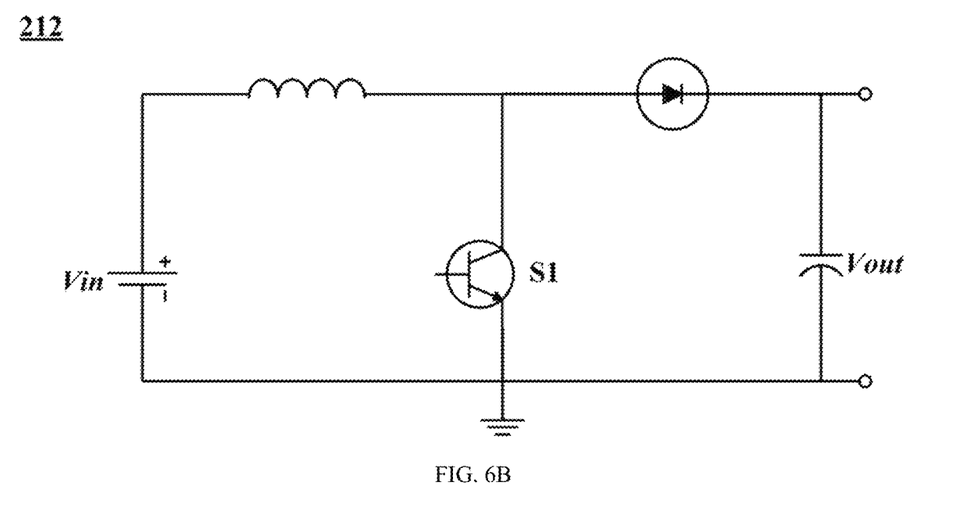
FIG. 6B illustrates a schematic view of a boost circuit according to an example embodiment.

The first-stage conversion circuit 21 may, for example, include a rectifier circuit 211 and a boost circuit 212 as shown in FIG. 6A. Specifically, the rectifier circuit 211 is used to rectify the received AC voltage. The rectifier circuit 211 may be, for example, a full-bridge rectifier circuit. The boost circuit 212 is used to boost the rectified DC voltage. The boost circuit 212 may be, for example, shown in FIG. 6B, and the second switching circuit is, for example, a switching transistor S1 in the boost circuit 212 in FIG. 6B. It should be noted that the boost circuit shown in FIG. 6B is merely exemplarily and is not intended to limit the present disclosure.

Figure 6C:
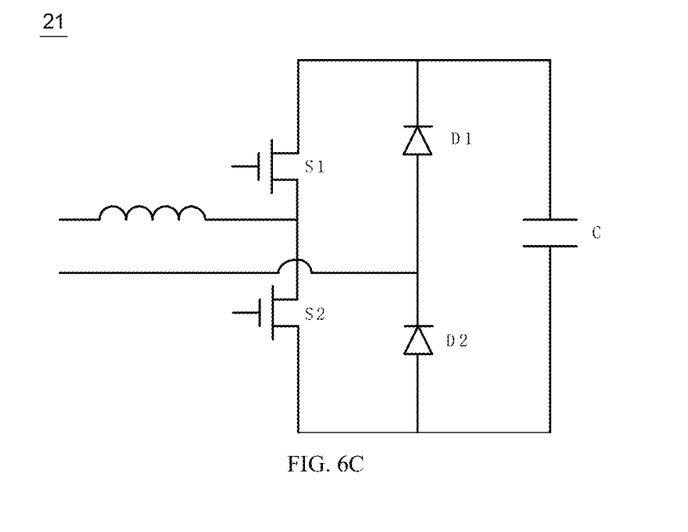
FIG. 6C illustrates a schematic view of a totem-pole boost circuit according to an example.

The first-stage conversion circuit 21 may also be implemented, for example, as a totem-pole boost circuit as shown in FIG. 6C. The second switching circuit may, for example, include switching transistors S1 and S2 in FIG. 6C.

It should be noted that the totem-pole boost circuit shown in FIG. 6C is merely exemplarily and is not intended to limit the present disclosure. A structure of the totem-pole boost circuit is well known to the skilled in the art and will not be described herein.

The control circuit 24 is used to output the PWM signal or output the PFM signal according to the output voltage and/or the output current of the first-stage conversion circuit 21, to adjust the output voltage and/or the output current of the first-stage conversion circuit 21 and thereby make the output voltage of the first-stage conversion circuit 21 be equal to a preset reference voltage.

Figure 3B:
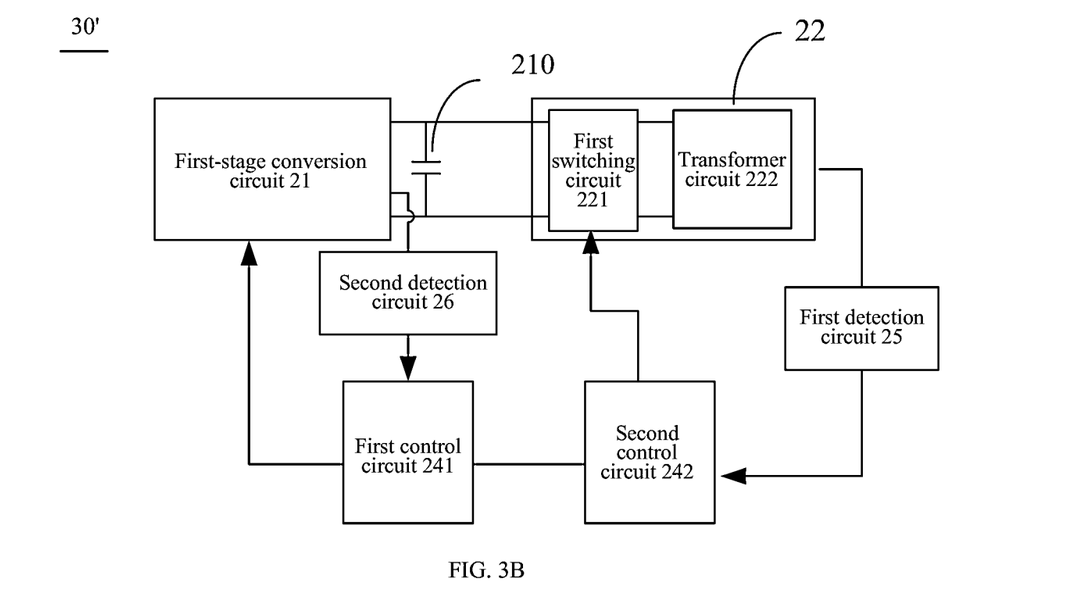
FIG. 3B illustrates a schematic structural view of still another power supply device according to an exemplary embodiment.

FIG. 3B illustrates a schematic structural view of still another power supply device according to an exemplary embodiment. Different from the power supply device 30 shown in FIG. 3A, the power supply device 30' in FIG. 3B includes a first control circuit 241 and a second control circuit 242 for controlling the first-stage conversion circuit 21 and the second-stage conversion circuit 22 respectively.

The second control circuit 242 is used to determine and output a PWM signal or a PFM signal as a control signal output to the first switching circuit 221 according to the output voltage and/or the output current of the transformer circuit 222 or the power supply device 30', to adjust the output voltage of the transformer circuit 222. The second control circuit 242 may further be used to adjust an output voltage and/or an output current of the power supply device 30' according to received feedback information.

The first control circuit 241 is used to determine and output a PWM signal or a PFM signal as a control signal output to the second switching circuit according to the output voltage and/or the output current of the first-stage conversion circuit 21, to adjust the output voltage and/or the output current of the first-stage conversion circuit 21 so that the output voltage of the first-stage conversion circuit 21 is equal to the preset reference voltage.

The first control circuit 241 and the second control circuit 242 may communicate with each other. For example, the first control circuit 241 may send a message to the second control circuit 242 to instruct the second control circuit 242 to start operating.

Figure 7:
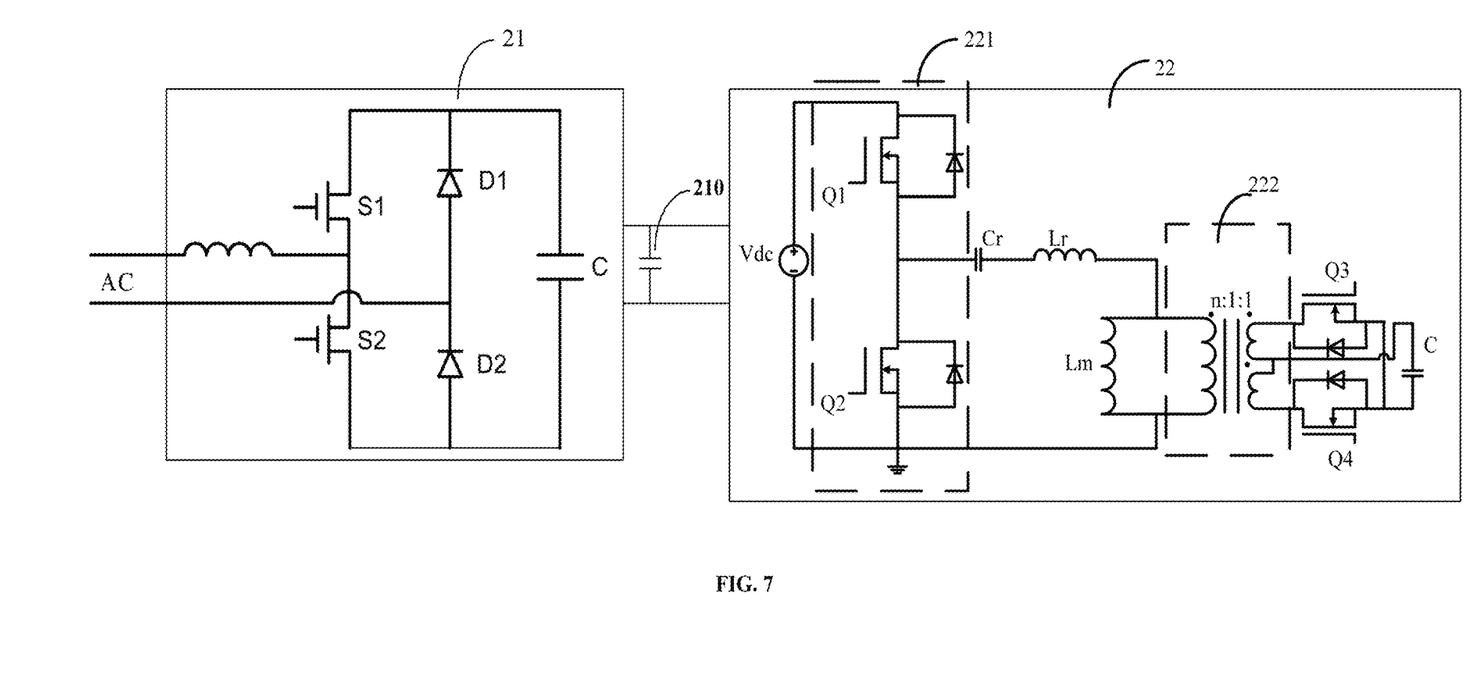
FIG. 7 illustrates a schematic structural view of even still another power supply device according to an example embodiment.

FIG. 7 illustrates a schematic structural view of even still another power supply device according to an example embodiment. In the power supply device as shown in FIG. 7, a first-stage conversion circuit 21 is exemplified by a totem-pole boost circuit, and a second-stage conversion circuit 22 is exemplified by an LLC resonant converter.

The following are method embodiments of the present disclosure that can be applied to the device embodiments of the present disclosure. For details not in the method embodiments of the present disclosure, please refer to the device embodiments of the present disclosure.

Figure 8:
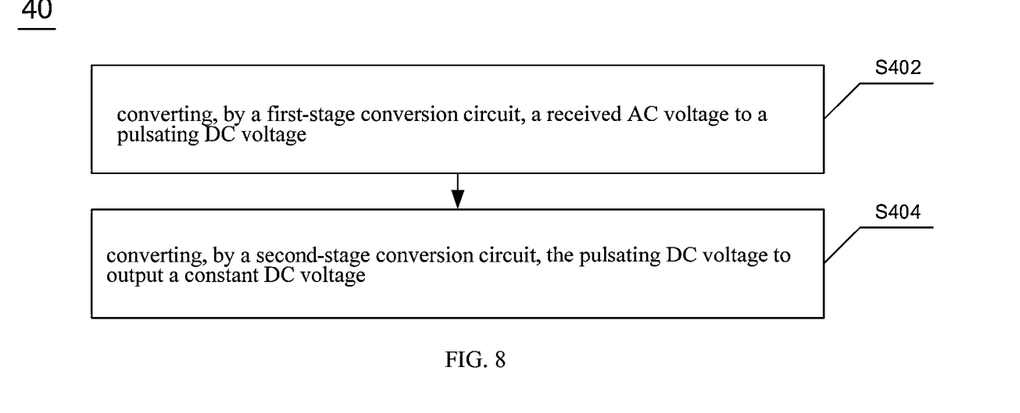
FIG. 8 illustrates a flowchart of a charging control method according to an exemplary embodiment.

FIG. 8 is a flowchart of a charging control method according to an exemplary embodiment. The charging control method may be applied, for example, to the power supply device 20 or the power supply device 30 or the power supply device 30' described above.

Referring to FIG. 8, the charging control method 40 may begin from block S402 to block 404.

In block S402, a received AC voltage is converted by a first-stage conversion circuit to a pulsating DC voltage.

Specifically, a voltage value of the pulsating DC voltage is greater than a voltage value of the AC voltage.

In block S404, the pulsating DC voltage is converted by a second-stage conversion circuit to output a constant DC voltage.

In some embodiments, the first-stage conversion circuit includes at least one filter capacitor of a capacity less than a preset value.

Figure 9:
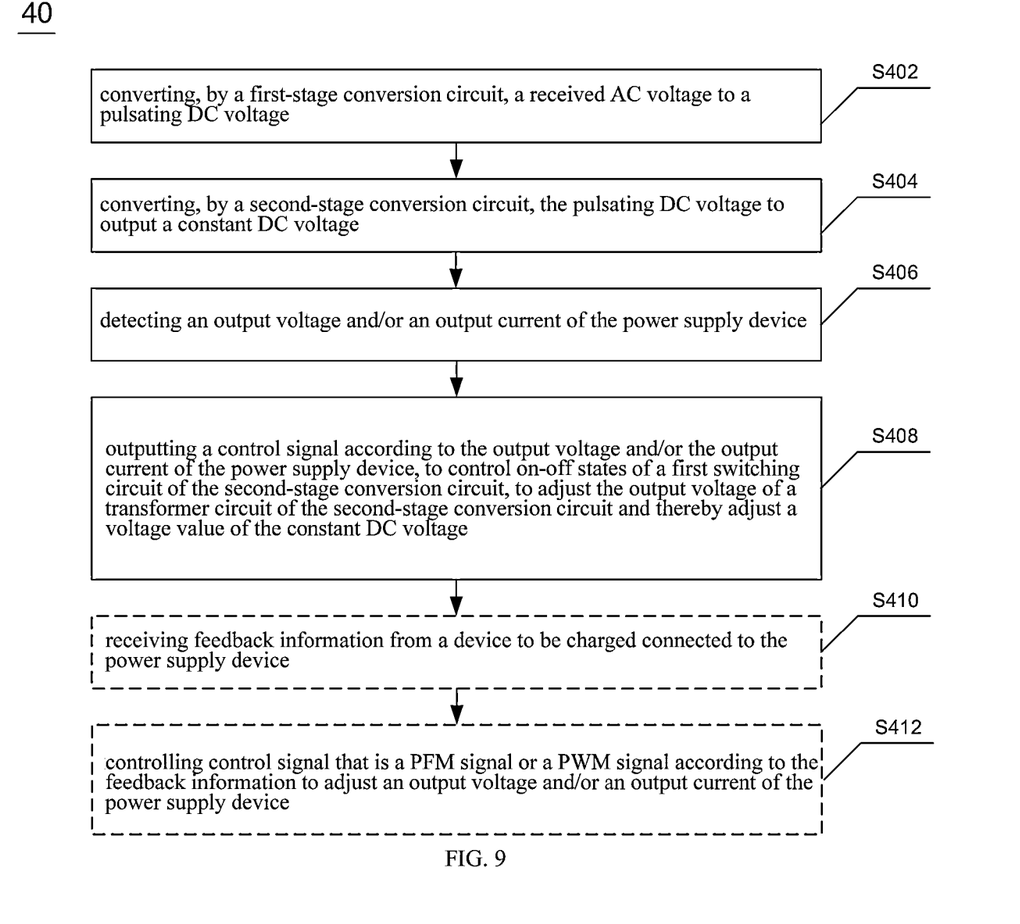
FIG. 9 illustrates a flowchart of another charging control method according to an exemplary embodiment.

In some embodiments, as shown in FIG. 9, the charging control method 40 may further include blocks S406 and S408.

In block S406, an output voltage and/or an output current of the power supply device is/are detected.

In block S408, a control signal is output according to the output voltage and/or the output current of the power supply device, to control on-off states of a first switching circuit of the second-stage conversion circuit, and adjust an output voltage of a transformer circuit of the second-stage conversion circuit and thereby adjust a voltage value of the constant DC voltage.

Figure 10:
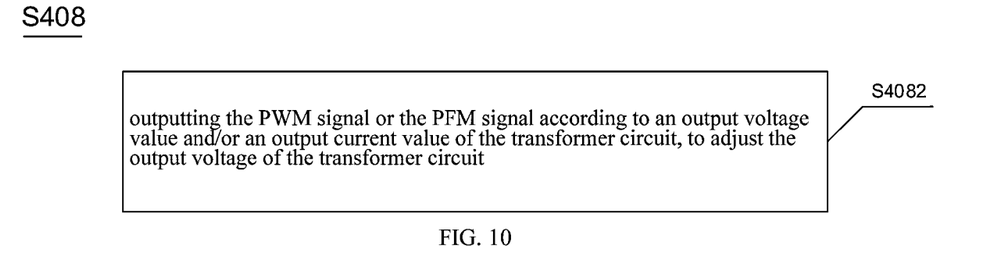
FIG. 10 illustrates a flowchart of still another charging control method according to an exemplary embodiment.

In some embodiments, as shown in FIG. 10, block S408 may include block S4082, in which a PWM signal or a PFM signal is output according to the output voltage and/or the output current of the power supply device, to adjust the output voltage of the transformer circuit.

In some embodiments, block 4082 may be implemented, for example, as follows: in response to the output voltage of the power supply device is smaller than a preset first voltage threshold, and/or the output current of the power supply device is smaller than a preset first current threshold, the PWM signal is output to adjust the output voltage of the transformer circuit; in response to the output voltage of the power supply device is greater than or equal to the first voltage threshold, and/or the output current of the power supply device is greater than or equal to the first current threshold, the PFM signal is output to adjust the output voltage of the transformer circuit.

Figure 11:
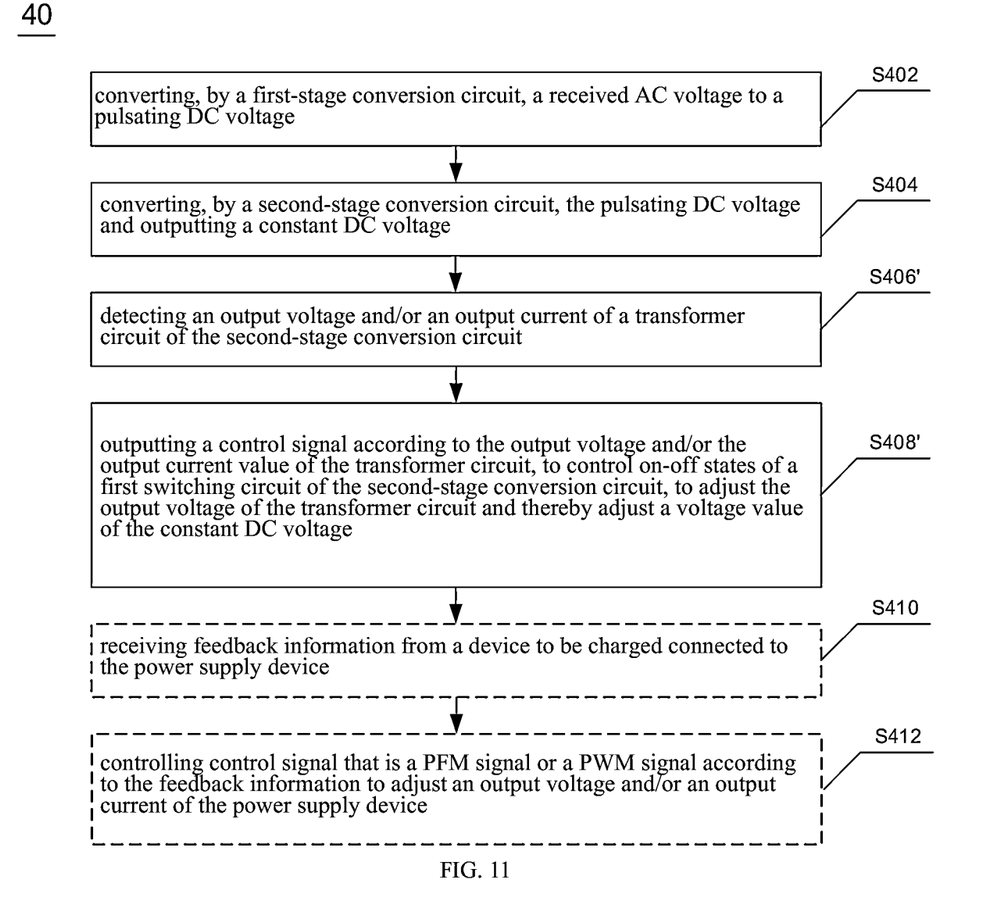
FIG. 11 illustrates a flowchart of even still another charging control method according to an exemplary embodiment.

In some embodiments, as shown in FIG. 11, the charging control method 40 further include blocks S406' and S408'.

In block S406', an output voltage and/or an output current of the transformer circuit of the second-stage conversion circuit is detected.

In block S408', a control signal is output according the output voltage and/or the output current of the transformer circuit, to control on-off states of the first switching circuit of the second-stage conversion circuit, and adjust the output voltage of the transformer circuit and thereby adjust the voltage value of the constant DC voltage.

Figure 12:
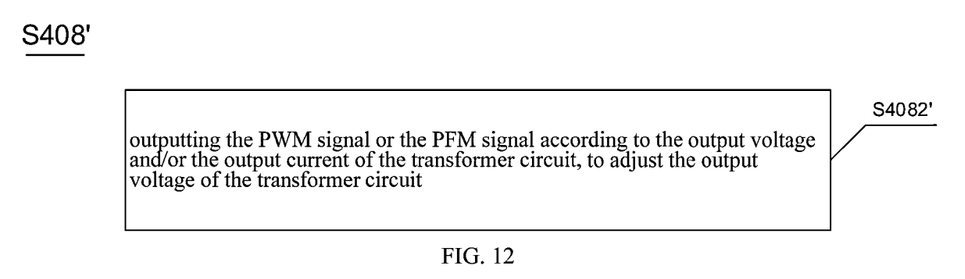
FIG. 12 illustrates a flowchart of even still another charging control method according to an exemplary embodiment.

In some embodiments, as shown in FIG. 12, block S408' may include block S4082'. In block S4082', a PWM signal or a PFM signal is output according to the output voltage and/or the output current of the transformer circuit to adjust the output voltage of the transformer circuit.

In some embodiments, block 4082' may, for example, be specifically implemented as follows: the PWM signal is output to adjust the output voltage of the transformer circuit in response to the output voltage of the transformer circuit is smaller than a preset first voltage threshold, and/or the output current of the transformer circuit is smaller than a preset first current threshold; the PWM signal is output to adjust the output voltage of the transformer circuit in response to the output voltage of the transformer circuit is greater than or equal to the first voltage threshold, and/or the output current of the transformer circuit is greater than or equal to the first current threshold.

In some embodiments, block 4082' may also, for example, be specifically implemented as follows: the output voltage of the transformer circuit is adjusted through outputting the PWM signal during a first charging phase; and the output voltage of the transformer circuit is adjusted through outputting the PFM signal during a second charging phase; where the output voltage of the power supply device during the first charging phase is smaller than the output voltage at the second charging phase.

In some embodiments, block 4082' may also, for example, be specifically implemented as follows: the output voltage of the transformer circuit is adjusted through outputting the PWM signal or the PFM signal based on a output gain. Specifically, the output gain is a ratio of the output voltage of the transformer circuit to the inputted voltage of the transformer circuit, or the output gain is a ratio of the output voltage of the second-stage conversion circuit to the output voltage of the first-stage conversion circuit.

In some embodiments, as shown in FIG. 9 or FIG. 11, the charging control method 40 may further include blocks S410 and S412. In block 410, feedback information of a device to be charged connected to the power supply device is received. In block S412, a control signal that is a PFM signal or a PWM signal is controlled according to the feedback information to adjust the output voltage and/or the output current of the power supply device.

In some embodiments, the feedback information includes: a desired charging voltage and/or a desired charging current of the device to be charged, or, an adjustment command generated by the device to be charged according to the desired charging voltage and/or the desired charging current.

With respect to the charging control method provided by embodiments of the present disclosure, because the first-stage conversion circuit boosts the inputted AC voltage, a variable bus voltage exists between the two-stage architecture formed by the first-stage conversion circuit and the second-stage conversion circuit, and energy storage function can be achieved by variation of the bus voltage, thus making it is not required for the power supply device performing the method to use a large volume capacitor as an energy storage element. Removing of the large volume capacitor can reduce the volume of the power supply device.

Figure 13:
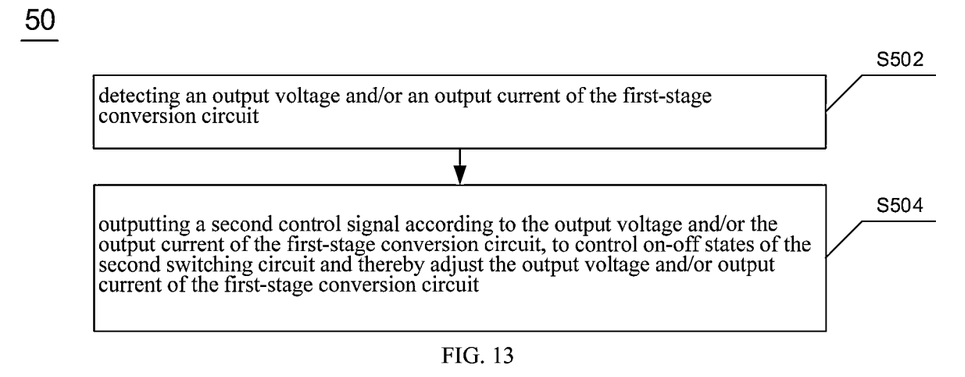
FIG. 13 illustrates a flowchart of even still another charging control method according to an exemplary embodiment.

FIG. 13 illustrates a flowchart of another charging control method illustrated according to an exemplary embodiment. Unlike the charging control method 40 shown in FIG. 8, the charging control method 50 shown in FIG. 13 may further include blocks S502 and S504.

In block S502, an output voltage and/or an output current of the first-stage conversion circuit is/are detected.

In block S504, a control signal is output based on the output voltage and/or the output current of the first-stage conversion circuit, to control on-off states of the second switching circuit of the first-stage conversion circuit and adjust the output voltage and/or the output current of the first-stage conversion circuit.

Figure 14:
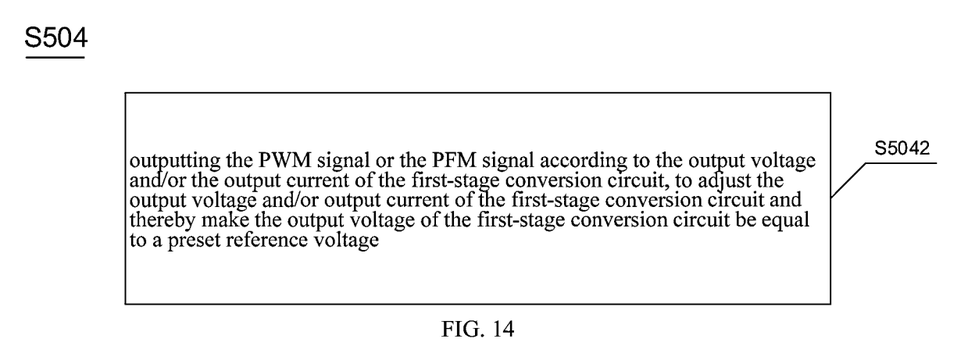
FIG. 14 illustrates a flowchart of even still another charging control method according to an exemplary embodiment.

In some embodiments, an input signal of the second switching circuit is a pulse width modulated signal. As shown in FIG. 14, block S504 may include block S5042. In block S5042, the output voltage and/or the output current of the first-stage conversion circuit is/are adjusted through outputting a PWM signal or a PFM signal based on the output voltage and/or the output current of the first-stage conversion circuit, so that the output voltage of the first-stage conversion circuit is equal to a preset reference voltage.

It should be noted that the above accompanying drawings are merely a schematic illustration of a processes included in the methods according to exemplary embodiments of the present disclosure, and are not intended to be limited thereto. It is readily understood that the processes shown above in the accompanying drawings does not indicate or limit the temporal order of these processes. It is also readily understood that these processes may be performed, for example, synchronously or asynchronously in multiple modules.

Exemplary embodiments of the present disclosure are specifically illustrated and described above. It should be understood that the present disclosure is not limited to detailed structures, arrangement manners, or implementation methods described herein; rather, the present disclosure is intended to cover a variety of modifications and equivalent arrangements included within the spirit and scope of the appended claims.

What is claimed is:

1. A power supply device, comprising:
a first-stage conversion circuit, configured to convert a received alternating current (AC) voltage to a pulsating direct current (DC) voltage, wherein a voltage value of the pulsating DC voltage is greater than a voltage value of the AC voltage; and
a second-stage conversion circuit, connected to the first-stage conversion circuit and configured to convert the pulsating DC voltage to output a constant DC voltage;
wherein the second-stage conversion circuit comprises a first switching circuit and a transformer circuit;
wherein the power supply device further comprises:
a first detection circuit, connected to the transformer circuit, and configured to detect at least one of an output voltage and an output current of one of the transformer circuit and the power supply device; and
a control circuit, connected to the first detection circuit and the first switching circuit, individually, wherein the control circuit is configured to output a control signal according to the at least one of the output voltage and the output current detected by the first detection circuit, to control on-off states of the first switching circuit to adjust the output voltage of the transformer circuit and thereby adjust a voltage value of the constant DC voltage.

2. The power supply device according to claim 1, wherein the first-stage conversion circuit comprises at least one filter capacitor, a capacity of the filter capacitor is smaller than a preset value.

3. The power supply device according to claim 1, wherein the control signal comprises a pulse width modulated (PWM) signal and a pulse frequency modulated (PFM) signal; and
the control circuit is configured to output one of the PWM signal and the PFM signal according to the at least one of the output voltage and the output current detected by the first detection circuit, to adjust the output voltage of the transformer circuit.

4. The power supply device according to claim 3, wherein the control circuit is configured to output the PWM signal or the PFM signal, according to an output gain, to adjust the output voltage of the transformer circuit;
wherein the output gain is a ratio of the output voltage of the transformer circuit to an inputted voltage of the transformer circuit, or the output gain is a ratio of an output voltage of the second-stage conversion circuit to an output voltage of the first-stage conversion circuit.

5. The power supply device according to claim 3, wherein the control circuit is configured to output the PWM signal during a first charging phase to adjust the output voltage of the transformer circuit, and configured to output the PFM signal during a second charging phase to adjust the output voltage of the transformer circuit;
wherein an output voltage of the power supply device during the first charging phase is lower than an output voltage of the power supply device during the second charging phase.

6. The power supply device according to claim 3, wherein the control circuit is configured to:
output the PWM signal to adjust the output voltage of the transformer circuit, in response to the at least one of the output voltage of the transformer circuit being smaller than a predetermined first voltage threshold, and the output current of the transformer circuit being smaller than a predetermined first current threshold;
output the PFM signal to adjust the output voltage of the transformer circuit, in response to the at least one of the output voltage of the transformer circuit being greater than or equal to the first voltage threshold, and the output current of the transformer circuit being greater than or equal to the first current threshold.

7. The power supply device according to claim 1, wherein the control circuit is further configured to: receive feedback information from a device to be charged connected to the power supply device, and control the control signal for the first switching circuit according to the feedback information to adjust at least one of the output voltage and the output current of the power supply device;
wherein the feedback information comprises at least one of a desired charging voltage and a desired charging current of the device to be charged, or the feedback information comprises an adjustment command generated by the device to be charged based on the at least one of the desired charging voltage and the desired charging current.

8. The power supply device according to claim 1, wherein the first-stage conversion circuit comprises a second switching circuit;
wherein the power supply device further comprises:
a second detection circuit, connected to the first-stage conversion circuit and the control circuit, individually;
wherein the second detection circuit is configured to detect at least one of an output voltage and an output current of the first-stage conversion circuit;
wherein the control circuit is further configured to output a second control signal according to at least one of the output voltage and the output current of the first-stage conversion circuit, to control on-off states of the second switching circuit and thereby adjust the at least one of the output voltage and the output current of the first-stage conversion circuit.

9. The power supply device according to claim 8, wherein the second control signal comprises a PWM signal and a PFM signal; the control circuit is configured to output one of the PWM signal and the PFM signal of the second control signal according to the at least one of the output voltage and the output current of the first-stage conversion circuit, to adjust the at least one of the output voltage and the output current of the first-stage conversion circuit and thereby make the output voltage of the first-stage conversion circuit be equal to a preset reference voltage.

10. The power supply device according to claim 2, wherein the capacitor comprises at least one selected from the group consisting of: a film capacitor, a multilayer ceramic capacitor, a surface-mounted capacitor, and an electrolytic capacitor;
wherein the first-stage conversion circuit comprises a totem-pole boost circuit, or comprises a rectifier circuit and a boost circuit; and wherein the second-stage conversion circuit comprises an inductor-inductor-capacitor (LLC) resonant converter.

11. A charging control method, implemented by a power supply device, comprising:
converting, by a first-stage conversion circuit, a received AC voltage to a pulsating DC voltage, wherein a voltage value of the pulsating DC voltage is greater than a voltage value of the AC voltage; and
converting, by a second-stage conversion circuit, the pulsating DC voltage to output a constant DC voltage;
wherein the method further comprises:
detecting at least one of an output voltage and an output current of one of a transformer circuit of the second-stage conversion circuit and the power supply device; and
outputting a control signal, according to the at least one of the output voltage and the output current of one of the transformer circuit and the power supply device, to control on-off states of a first switching circuit of the second-stage conversion circuit, to adjust the output voltage of the transformer circuit and thereby adjust a voltage value of the constant DC voltage.

12. The method according to claim 11, wherein the first-stage conversion circuit comprises at least one filter capacitor, a capacity of the filter capacitor is smaller than a preset value.

13. The method according to claim 11, wherein the control signal comprises a PWM signal and a PFM signal;
wherein the outputting a control signal according to the at least one of the output voltage and the output current of the transformer circuit, to control on-off states of a first switching circuit of the second-stage conversion circuit to adjust the output voltage of the transformer circuit and thereby adjust a voltage value of the constant DC voltage specifically comprises:
outputting the PWM signal or the PFM signal according to the at least one of the output voltage and the output current of the transformer circuit, to adjust the output voltage of the transformer circuit.

14. The method according to claim 13, wherein the outputting the PWM signal or the PFM signal according to the at least one of the output voltage and the output current of the transformer circuit, to adjust the output voltage of the transformer circuit specifically comprises:
outputting the PWM signal or the PFM signal according to an output gain, to adjust the output voltage of the transformer circuit;
wherein the output gain is a ratio of the output voltage of the transformer circuit to an inputted voltage of the transformer circuit, or the output gain is a ratio of an output voltage of the second-stage conversion circuit to an output voltage of the first-stage conversion circuit.

15. The method according to claim 13, wherein the outputting the PWM signal or the PFM signal according to the at least one of the output voltage and the output current of the transformer circuit, to adjust the output voltage of the transformer circuit specifically comprises:
outputting the PWM signal during a first charging phase to adjust the output voltage of the transformer circuit, and
outputting the PFM signal during a second charging phase to adjust the output voltage of the transformer circuit;
wherein an output voltage of the power supply device during the first charging phase is smaller than an output voltage of the power supply device during the second charging phase.

16. The method according to claim 13, wherein the outputting the PWM signal or the PFM signal according to the at least one of the output voltage and the output current of the transformer circuit, to adjust the output voltage of the transformer circuit specifically comprises:
outputting the PWM signal to adjust the output voltage of the transformer circuit, in response to the at least one of the output voltage of the transformer circuit being smaller than a predetermined first voltage threshold, and the output current of the transformer circuit being smaller than a predetermined first current threshold;
outputting the PFM signal to adjust the output voltage of the transformer circuit, in response to the at least one of the output voltage of the transformer circuit being greater than or equal to the first voltage threshold, and the output current of the transformer circuit being greater than or equal to the first current threshold.

17. The method according to claim 11, further comprising:
receiving feedback information from a device to be charged connected to the power supply device;
controlling the control signal for the first switching circuit according to the feedback information, to adjust at least one of the output voltage and the output current of the power supply device;
wherein the feedback information comprises at least one of a desired charging voltage a desired charging current of the device to be charged, or the feedback information comprises an adjustment command generated by the device to be charged according to the at least one of the desired charging voltage and the desired charging current.

18. The method according to claim 11, further comprising:
detecting at least one of an output voltage and an output current of the first-stage conversion circuit; and
outputting a second control signal according to the at least one of the output voltage and the output current of the first-stage conversion circuit, to control on-off states of the second switching circuit and thereby adjust the at least one of the output voltage and the output current of the first-stage conversion circuit;
wherein the second control signal comprises a PWM signal and a PFM signal; the outputting a second control signal according to the at least one of the output voltage and the output current of the first-stage conversion circuit, to control on-off states of the second switching circuit and thereby adjust the at least one of the output voltage and the output current of the first-stage conversion circuit specifically comprises:
outputting one of the PWM signal and the PFM signal according to the at least one of the output voltage and the output current of the first-stage conversion circuit, to adjust the at least one of the output voltage and the output current of the first-stage conversion circuit and thereby make the output voltage of the first-stage conversion circuit be equal to a preset reference voltage.

* * * * *